(12) United States Patent
Yoshida

(10) Patent No.: US 9,618,113 B2
(45) Date of Patent: Apr. 11, 2017

(54) RANGE SWITCHOVER CONTROL SYSTEM

(71) Applicant: DENSO CORPORATION, Kariya, Aichi-pref. (JP)

(72) Inventor: Kazuhiro Yoshida, Tokoname (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 14/546,500

(22) Filed: Nov. 18, 2014

(65) Prior Publication Data
US 2015/0152963 A1 Jun. 4, 2015

(30) Foreign Application Priority Data

Dec. 2, 2013 (JP) ................................. 2013-248844

(51) Int. Cl.
| | | |
|---|---|---|
| *F16H 61/28* | (2006.01) | |
| *F16H 63/34* | (2006.01) | |
| *F16H 61/24* | (2006.01) | |

(52) U.S. Cl.
CPC ......... *F16H 61/28* (2013.01); *F16H 63/3425* (2013.01); *F16H 2061/247* (2013.01); *F16H 2061/283* (2013.01); *F16H 2061/2861* (2013.01)

(58) Field of Classification Search
None
See application file for complete search history.

(56) References Cited

U.S. PATENT DOCUMENTS

| | | | |
|---|---|---|---|
| 2001/0005816 A1* | 6/2001 | Kusafuka | F16H 59/08 702/96 |
| 2003/0222617 A1 | 12/2003 | Nakai et al. | |
| 2004/0162661 A1* | 8/2004 | Kikuchi | B60K 37/06 701/62 |
| 2008/0215215 A1 | 9/2008 | Kashiwagi | |
| 2010/0294066 A1* | 11/2010 | Itazu | F16H 59/08 74/473.12 |

OTHER PUBLICATIONS

Office Action (2 pages) dated Oct. 1, 2015, issued in corresponding Japanese Application No. 2013-248844 and English translation (3 pages).

\* cited by examiner

*Primary Examiner* — Edwin A Young
(74) *Attorney, Agent, or Firm* — Nixon & Vanderhye P.C.

(57) ABSTRACT

A SBW-ECU switches over a shift range to a selected range by rotationally driving a motor to a target position corresponding to the selected range. When a direction of rotation of the motor is the same as a direction toward the target position and a difference between the target position and a present position is larger than a threshold value in a case that the selected range is changed during rotational driving of the motor, the target position is updated to a post-change target position. When the direction of rotation of the motor is opposite to the direction toward the target position or the difference between the target position and the present position is smaller than the threshold value in the case that the selected range is changed during rotational driving of the motor, the target position is updated to the post-change target position after completing the switchover to the pre-change selected range.

6 Claims, 6 Drawing Sheets

RANGE SWITCHOVER CONTROL SYSTEM

CROSS REFERENCE TO RELATED APPLICATION

This application is based on and incorporates herein by reference Japanese patent application No. 2013-248844 filed on Dec. 2, 2013.

FIELD

The present disclosure relates to a range switchover control system, which switches over a shift range of a power transfer apparatus by using a motor as a drive power source.

BACKGROUND

Recently conventional mechanical drive systems are changed to electric drive systems using motors in vehicles to meet requirements for saving spaces, improving assembling work, improving controllability and the like purposes.

One example of such electric drive systems is a system, which drives a range switchover mechanism of an automatic transmission of a vehicle by a motor. In this system, when a selected range is changed by a shift operation or the like made by a driver, the motor is rotationally driven to a target position corresponding to the selected range thereby to switchover a shift range to the selected range.

According to JP-A-2004-23890 (US 2003/0222617), when a motor is requested to reverse its direction of rotation in response to a change of a target position during rotation of the motor, motor stop-and-hold processing is executed for a predetermined time period and then the motor is driven again to the requested target position.

The motor cannot be instantly stopped or rotated in reverse instantly while it is being rotationally driven. For this reason, when the selected range is changed by the shift operation of the driver while the motor is being rotationally driven, that is, during a switchover operation of the shift range, and the target position is changed responsively at that time, the motor may not be stopped at the target position.

According to the patent document, when the direction of rotation of the motor need be reversed in response to the change of the target position during driving of the motor, the motor stop-and-hold processing is executed for the predetermined time period and thereafter the motor is driven again to rotate to the post-change target position. However, even when the target position is changed during driving of the motor and the direction of rotation of the motor need not be reversed, the motor may not be stopped at the post-change target position in a case that the post-change target position differs only slightly from the pre-change target position which corresponds to the pre-change selected range.

It is proposed therefore that, when the selected range is changed during driving of the motor (during shift range switchover), the motor is rotationally driven to the target position corresponding to the post-change selected range to attain the switchover to the post-change selected range after the motor has been driven to the target position corresponding to the pre-change selected range and the shift range has been switched over to the pre-change selected range.

Under this control, when the selected range is changed during driving of the motor, the range is switched over to the post-change selected range after each time waiting for a completion of the switchover to the pre-change selected range. As a result, since the switchover to the post-change selected range takes more time, the response characteristic of the range switchover lowers and shift feeling of the driver is degraded.

SUMMARY

It is therefore an object to provide a range switchover control system, which improves a range switchover characteristic in a case of a change of a selected range during rotational driving of a motor.

According to one aspect, a range switchover control system comprises a motor provided as a drive power source, a range switchover mechanism that switches over a shift range among plural ranges by using drive power of the motor, a range selector that selects the shift range, and an electronic control unit programmed to switch over the shift range to a selected range by rotationally driving the motor to a target position set in accordance with the selected range.

The electronic control unit is programmed to update the target position, in a case that the selected range is changed from a pre-change range of the shift range to a post-change range of the shift range during rotational driving of the motor, from a pre-change target position corresponding to the pre-change range to the post-change target position corresponding to the post-change range when a direction of rotation of the motor toward the post-change target position is same as a direction toward the pre-change target position of rotation of the motor and a difference between the post-change target position and a present position of rotation of the motor is larger than a threshold value.

The electronic control unit is programmed to update the target position, in a case that the selected range is changed from the pre-change range to the post-change range during rotational driving of the motor, from the pre-change target position to the post-change target position after completing the switchover to the pre-change range when the direction of rotation of the motor toward the post-change target position is opposite to the direction toward the pre-change target position or the difference between the post-change target position and the present position is equal to or smaller than the threshold value.

EMBODIMENT

Figure 1:
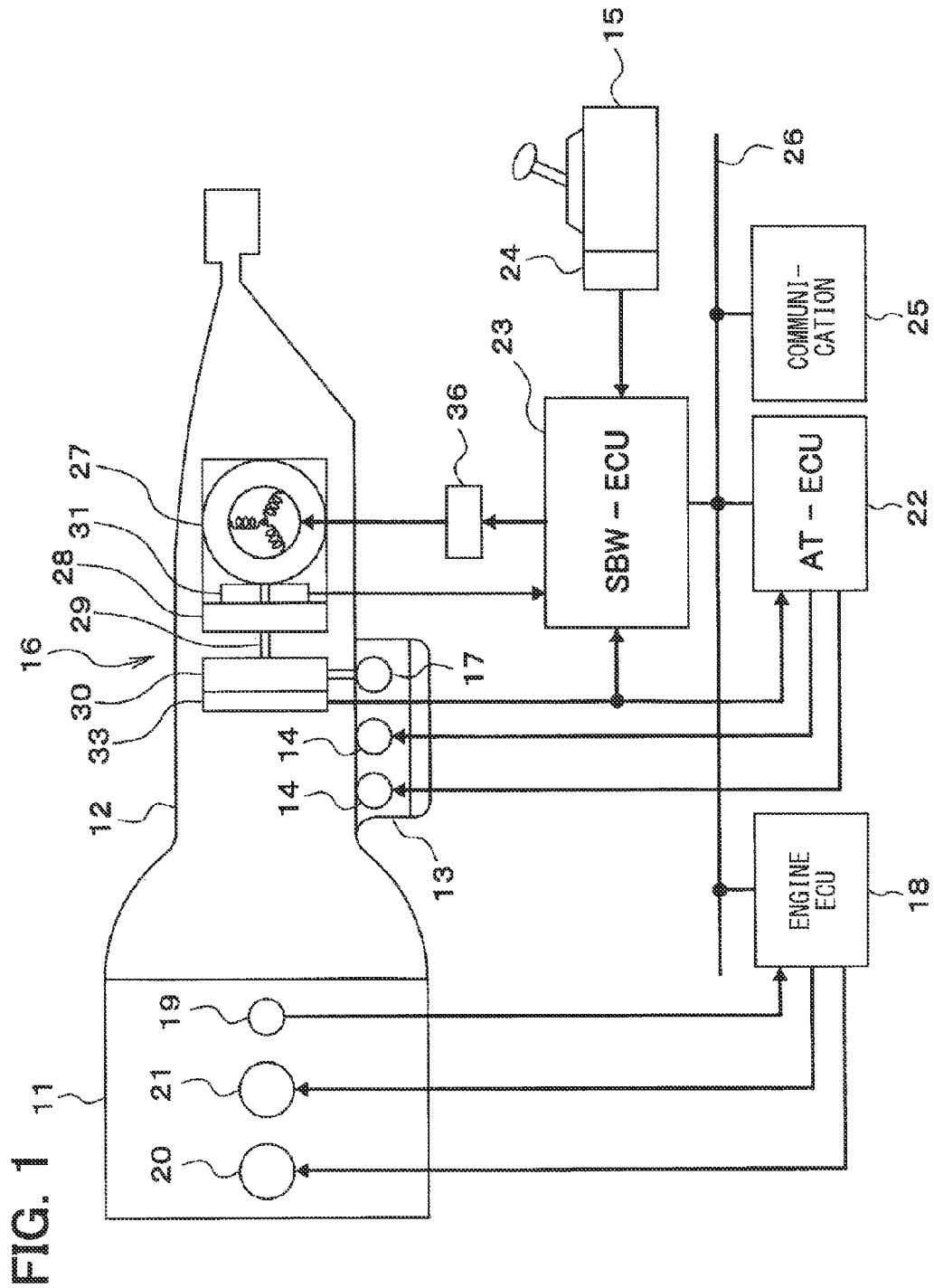
FIG. 1 is a schematic diagram showing a general configuration of an automatic transmission control system according to one embodiment.

A range switchover control system will be described with reference to FIG. 1, which shows an automatic transmission control system as one embodiment. An output shaft (crankshaft) of an engine 11 is coupled to an input shaft of an automatic transmission (AT) 12. The automatic transmission 12 is provided with a speed-change gear mechanism (not shown), a hydraulic control circuit 13 and the like. The speed-change gear mechanism is provided with friction engagement devices (not shown) such as plural clutches and brakes for switching over speed change stages (speed change ratios). The hydraulic control circuit 13 is provided with a hydraulic control valve 14, which controls hydraulic pressure applied to the friction engagement devices, and a manual valve 17, which switches over hydraulic circuits of hydraulic oil for the friction engagement devices. The manual valve 17 is driven by a range switchover mechanism 16 in linking correspondence to a range selector 15.

An engine electronic control unit (ECU) 18, which controls the engine 11, controls a throttle opening position (throttle valve opening position) of a throttle device 20 based on an output signal of an accelerator sensor 19, which detects an accelerator position (accelerator pedal operation amount), and the like.

An AT-ECU 22, which controls a speed-change operation of the automatic transmission 12, switches over speed change stages of the automatic transmission 12 by controlling an open/close operation of each hydraulic control valves 14 of the hydraulic control circuit 13 thereby to control the hydraulic pressure supplied to each friction engagement device.

A shift-by-wire (SBW) ECU 23, which controls a range switchover operation of the automatic transmission 12, controls a motor 27 of the range switchover mechanism 16 based on an output signal of a selector sensor 24, which detects a selected range selected by a range selector 15 (selected range change means). Thus a shift range of the automatic transmission 12 is switched over by controlling the switchover operation of the manual valve 17 in accordance with the range switchover operation of a driver. The range switchover mechanism 16, the SBW-ECU 23 and the like form a shift-by-wire system.

The engine ECU 18, the AT 22, the SBW-ECU 23, a communication device 25 and the like are connected via communication line 26 (for example, in-vehicle LAN and the like) to transmit and receive necessary information mutually by using CAN communication or the like.

Figure 2:
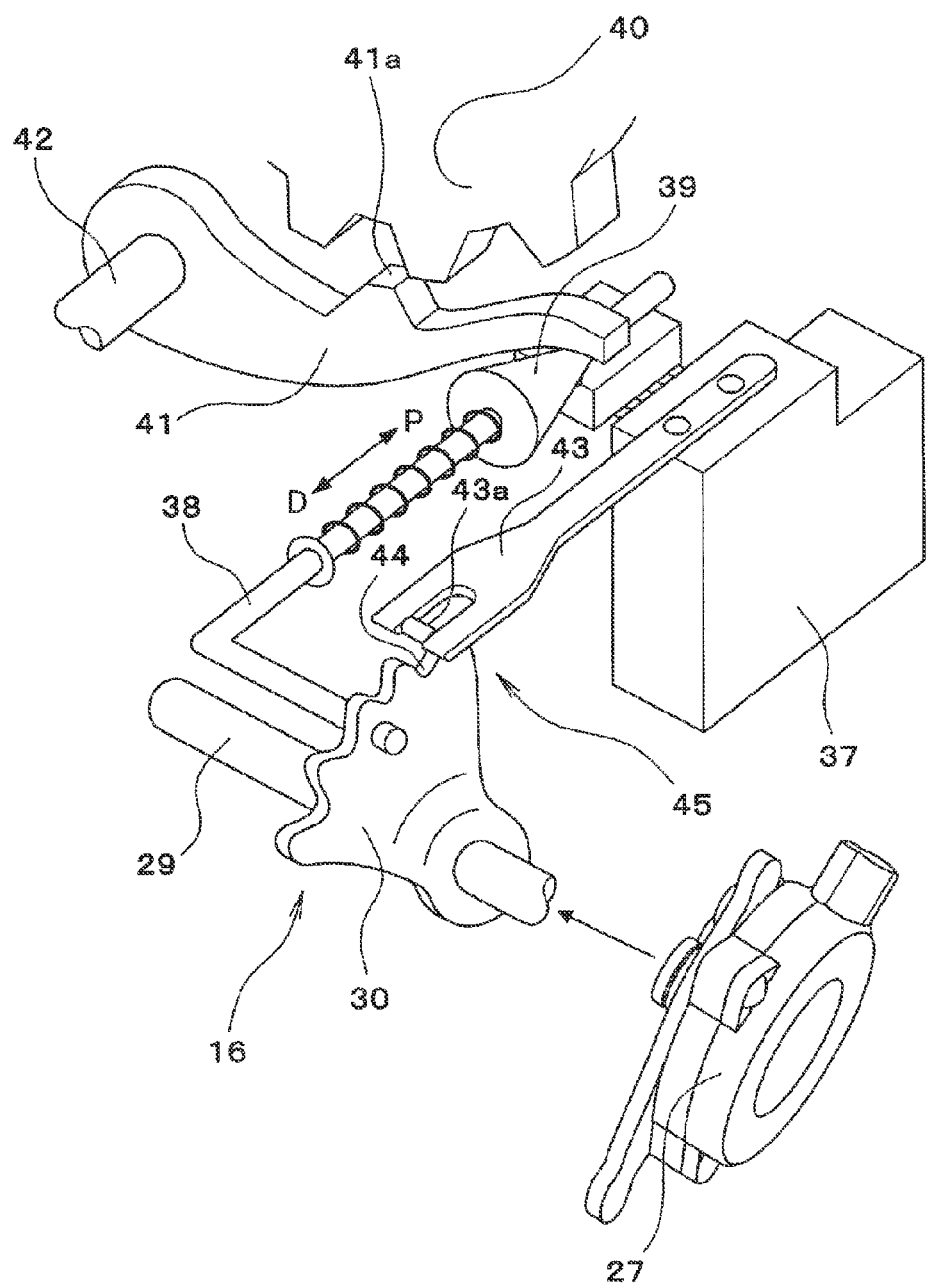
FIG. 2 is a perspective view of a range switchover mechanism in the embodiment.

As shown in FIG. 2, the range switchover mechanism 16 is a four position type range switchover mechanism, which switches over the shift range of the automatic transmission 12 among four ranges of, for example, a P-range (parking range), a R-range (reverse range), a N-range (neutral range) and a D-range (drive range). These shift ranges are selected in the predetermined order of the P-range, the R-range, the N-range and the D-range. The motor 27, which is a drive power source for the range switchover mechanism 16, is a switched reluctance motor for example. A rotary shaft of the motor 27 is linked with a manual shaft 29 through a speed reduction mechanism 28 (shown in FIG. 1), to which a detent lever 30 is fixed.

The manual valve 17 (shown in FIG. 1) is coupled to the detent lever 30 so that the manual valve 17 moves linearly in correspondence to a rotation of the detent lever 30. The manual valve 17 switches over the hydraulic circuits of the automatic transmission 12 thereby to switch over the shift ranges. Thus the shift range of the automatic transmission 12 is controlled in accordance with the angle of rotation (angular position) of the motor 27.

An L-shaped parking rod 38 is fixed to the detent lever 30. A conical member 39 provided at a top end of the parking rod 38 contacts a lock lever 41. The lock lever 41 is shaped to move up and down about a shaft 42 in accordance with the position of the conical member 39 thereby to lock/unlock a parking gear 40. The parking gear 40 is provided on the output shaft of the automatic transmission 12. When the parking gear 40 is locked by the lock lever 41, drive wheels of a vehicle is maintained in a rotation-restricted state (parking state).

A detent spring 43, which maintains the detent lever 30 in each of the P, R, N and R-ranges in this order, is fixed to a support base 37. The detent lever 30 is formed range-holding recesses 44 for the ranges P, R, N and D, respectively, in this order. When an engagement part 43a formed at a top end of the detent spring 43 is fit in the range holding recesses 44 of the detent lever 30, the detent lever 30 is maintained in the corresponding range positions, respectively. The detent lever 30 and the detent spring 43 form a detent mechanism (moderation mechanism), which engages and holds the rotary position of the detent lever 30 in the corresponding range position, that is, maintains the range switchover mechanism 16 in the corresponding range position.

In the P-range, the parking rod 38 moves in a direction to approach the lock lever 41 so that the large-diameter part of the conical member 39 lifts the lock lever 41 and a protrusion part 41a of the lock lever 41 fits in the parking gear 40 for locking the parking gear 40. As a result, the output shaft of the automatic transmission 12 (drive wheels) is maintained in the locked state (parking state).

In the ranges other than the P-range, the parking rod 38 moves in a direction to depart from the lock lever 41 so that the large-diameter part of the conical member 39 leaves the lock lever 41 and the lock lever 41 moves down. The protrusion 41a of the lock lever 41 is disengaged from the parking gear 40 to unlock the parking gear 40. As a result, the output shaft of the automatic transmission 12 is maintained in the rotatable state (power transfer state for travel).

As shown in FIG. 1, the motor 27 is provided with an encoder 31 as a rotation angle sensor, which detects a rotation angle (rotation position) of a rotor of the motor 27. The encoder 31 is for example a magnetic-type rotary encoder and configured to output to the SBW-ECU 23 a pulse signal at every predetermined angular rotation in synchronism with the rotation of the rotor of the motor 27. The SBW-ECU 23 counts the pulse signal of the encoder 31 and drives the motor 27 to rotate by switching over a current supply phase of the motor 27 in a predetermined order in accordance with a count value (referred to as an encoder count value below). Since the shift range of the automatic transmission 12 is varied in accordance with the rotation angle of the motor 27 as described above, the encoder count value indirectly indicates an actual shift range.

A rotation angle sensor 33 is provided for detecting a rotation angle (rotation position) of the manual shaft 29 or the detent lever 30. The rotation angle sensor 33 is formed of a sensor (for example, potentiometer), which outputs a voltage corresponding to a rotation angle of the manual shaft 29 or the detent lever 30. Based on this output voltage, it is possible to confirm whether the actual shift range is the P-range, R-range, N-range or D-range. A selector sensor 24 detects a selected range selected by a driver by operating the range selector 15, which may be a lever-type, a button-type or the like, and outputs its output signal to the SBW-ECU 23.

When the selected range is changed by the driver by operating the range selector 15, the SBW-ECU 23 drives the motor 27 to rotate to the target position corresponding to the selected range based on the encoder count value so that the shift range may be switched over to a post-change selected range.

It is noted that the motor 27 cannot be stopped instantly nor reversed instantly to rotate in an opposite direction. For this reason, it is likely that the motor 27 cannot be stopped at the target position when the target position is changed instantly under a state that the selected range is changed by an operation of a driver during rotational driving of the motor 27 (during switchover of the shift range from the pre-change selected range to the post-change selected range).

Figure 3:
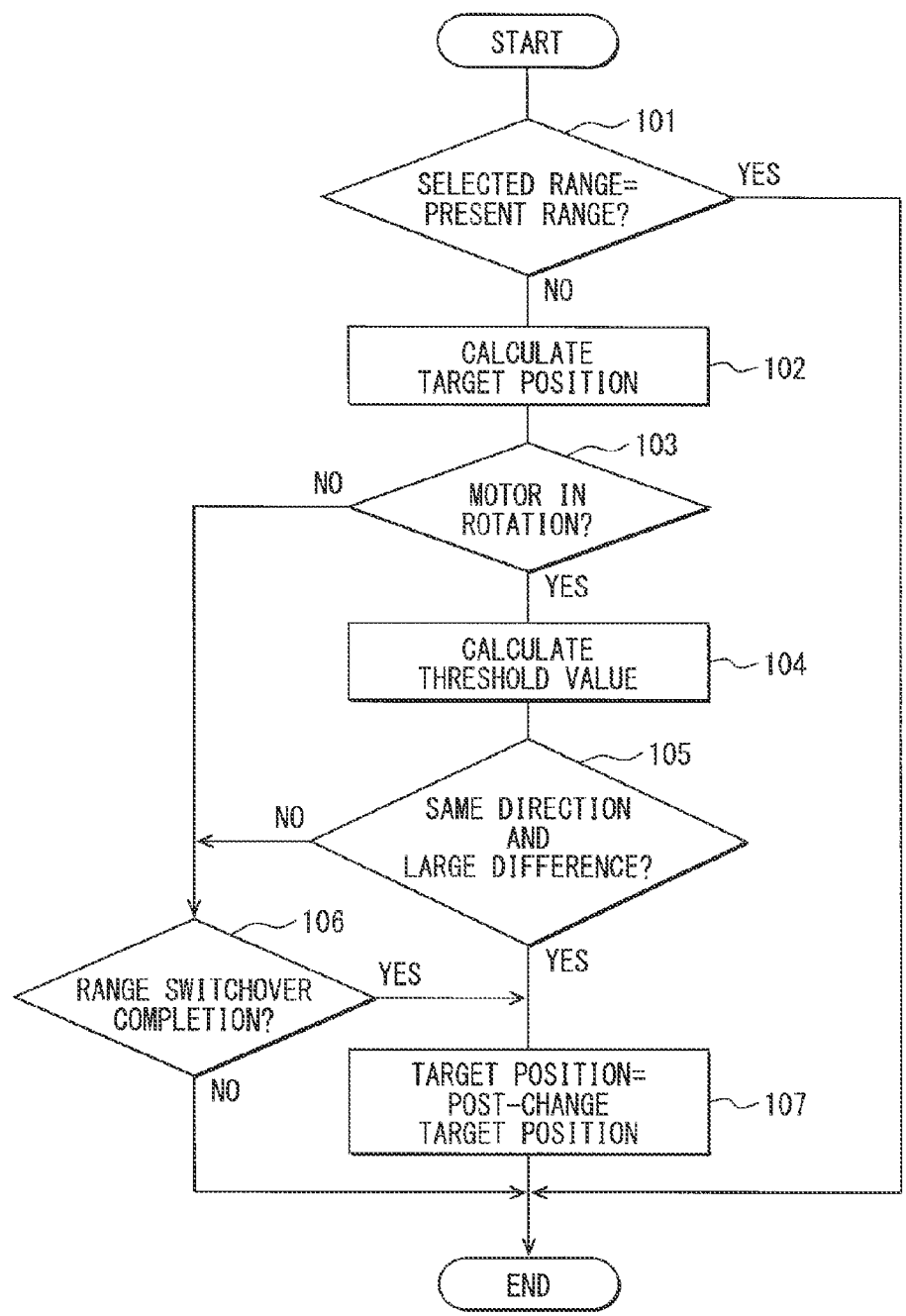
FIG. 3 is a flowchart showing processing of a target position setting routine in the embodiment.

According to the present embodiment, for this reason, the SBW-ECU 23 is configured to execute a target position setting routine shown in FIG. 3 as described below so that the target position is changed in the following manner in response to a change in the selected range. The SBW-ECU 23 calculates, as the present position, the present motor rotation position (encoder count value) and calculates, as the target position, the motor rotation position (encoder count value) corresponding to the selected range.

When the selected range is changed after completion of the previous switchover of the shift range (that is, during stop of rotational driving of the motor 27), the target position is updated from a pre-change target position to a post-change target position (that is, a new target position corresponding to the post-change selected range).

When the direction of rotation of the motor 27 is in the same direction as the direction for the target position (that is, the motor 27 need not be reversed to rotate in the opposite direction) at the time of a change in the selected range during the rotational driving of the motor 27, the motor 27 can be stopped at the target position if the target position is sufficiently away from the present position.

It is thus determined that the motor 27 can be stopped at the target position, if the direction of rotation of the motor 27 is the same as the direction for the target position and a difference between the target position and the present position is larger than a predetermined threshold value. At this time, the target position is updated from the pre-change target position to the post-change target position (corresponding to the post-change selected range). With this switchover control, the shift range can be switched over speedily to the post-change selected range by rotationally driving the motor 27 to the post-change target position without waiting for completion of the switchover to the pre-change selected range.

When the direction of rotation of the motor 27 is in the opposite direction to the direction for the target position (that is, the motor 27 need be reversed to rotate in the opposite direction) or the target position is not sufficiently away from the present position at the time of a change in the selected range during the rotational driving of the motor 27, the motor 27 cannot be stopped at the target position.

It is thus determined that the motor 27 cannot be stopped at the target position, if the direction of rotation of the motor 27 is opposite to the direction for the target position or the difference between the target position and the present position is equal to or smaller larger than the predetermined threshold value at the time of change of the selected range during the rotational driving of the motor 27. The target position is updated to the post-change target position (corresponding to the post-change selected range) after completing the switchover to the pre-change selected range (corresponding to the pre-change selected range). With this switchover control, the shift range can be switched over surely to the post-change selected range by rotationally driving the motor 27 to the post-change target position after the completion of the switchover to the pre-change selected range.

A target position setting routine, which is executed by the SBW-ECU 23 and shown in FIG. 3 will be described next. The SBW-ECU 23 is programmed to execute the target position setting routine shown in FIG. 3 repeatedly at every predetermine interval while the SBW-ECU 23 is being supplied with electric power.

When this routine is started by the SBW-ECU 23, it is checked first at step 101 whether the selected range is the same as the present range (shift range at this time). When it is determined at step 101 that the selected range is the same as the present range, this routine is finished without executing step 102 and subsequent steps.

When it is determined at step 101 that the selected range is not the same as the present range because of the change in the selected range thereafter, step 102 is executed so that the motor rotation position (requested or target encoder count value) corresponding to the selected range is calculated as the target position.

Then it is checked at step 103 whether the motor 27 is being rotationally driven, that is, motor 27 is being in rotation. When it is determined at step 103 that the motor 27 is not being rotationally driven, that is, the motor 27 is being stopped or at rest, it is checked at step 106 whether the range switchover has been completed (state of completion of the shift range switchover) based on, for example, whether the present position is the same as the target position. When it is determined at this step 106 that the range switchover has been completed, the target position is updated to the post-change target position (target position corresponding to the post-change selected range) at step 107.

When it is determined at step 103 that the motor 27 is still being rotationally driven, a threshold value is calculated at step 104 in accordance with the present rotation speed of the motor 27 by using a data map or a mathematical equation. The data map or the mathematical equation for the threshold value is so set that the threshold value increases as the rotation speed of the motor 27 increases, since the angular rotation required to stop the motor 27 normally increases as the rotation speed of the motor 27 increases. The data map or the mathematical equation data for the threshold value is predetermined based on test data or design data and stored in a ROM (not shown) or the like of the SBW-ECU 23.

Then it is checked at step 105 whether the direction of rotation of the motor 27 at that time is the same as the direction for approaching the target position and the difference between the target position and the present position is larger than the threshold value.

Specifically, when the motor 27 is in a normal rotation (the motor 27 is rotating in a direction to increase the encoder count value), it is checked whether a value resulting from a subtraction of the present position from the target position (target position—present position) is larger than the threshold value. When the motor 27 is in a reverse rotation (the motor 27 is rotating in a direction to decrease the encoder count value), it is checked whether a value resulting from a subtraction of the target position from the present position (present position—target position) is larger than the threshold value.

When a determination result at step 105 is YES, that is, the rotation direction of the motor 27 is the same as the direction for moving toward the target position and the difference between the target position and the present position is larger than the threshold value, it is determined that the motor 27 can be stopped at the target position. In this case, the target position is updated to the post-change target position (position corresponding to the post-change selected range) at step 107.

When a determination result at step 105 is NO, that is, the rotation direction of the motor 27 is opposite to the direction for moving toward the target position or the difference between the target position and the present position is smaller than the threshold value, it is determined that the motor 27 cannot be stopped at the target position. In this case, it is checked at step 106 whether it is in the range switchover completion state (the range switchover has been completed).

When it is determined at step 106 that the range switchover has not been completed, this routine is finished. When it is determined at step 106 that the range switchover has been completed, the target position is updated to the target position (target position corresponding to the post-change selected range) at step 107.

Figure 4:
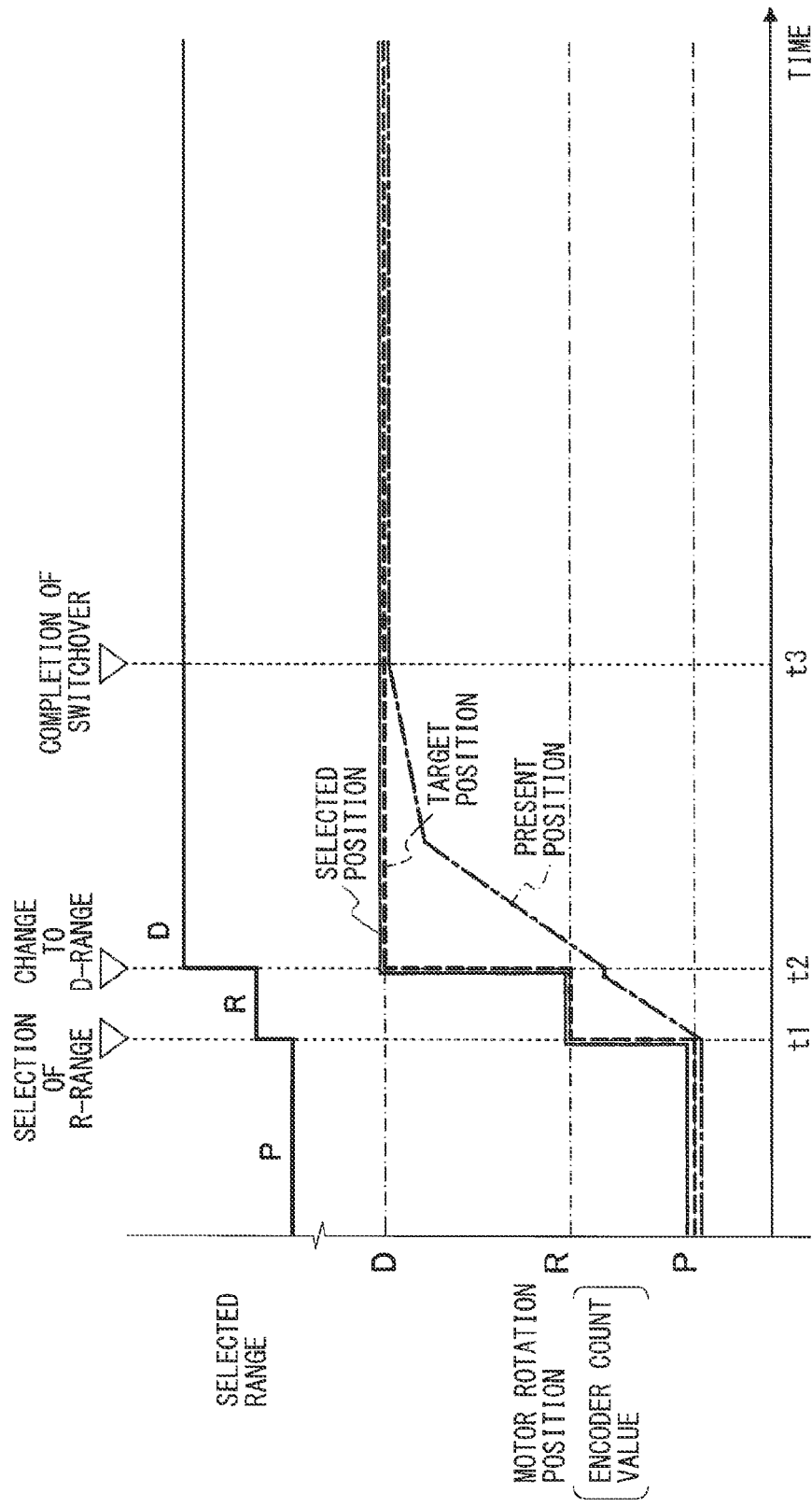
FIG. 4 is a time chart showing an example of switchover control in a case of a change of a selected range from a P-range to a D-range through a R-range.

Examples of the target value setting in the present embodiment will be described below with reference to time charts of FIG. 4 to FIG. 6, in which a solid line, a broken line and a one-dot chain line indicate a selected position (corresponding to a selected range), a target position and a present (actual position), respectively. FIG. 4 is an example of switchover control in a case that the selected range is changed from the R-range to the D-range while the shift range is being switched over from the P-range to the R-range in correspondence to a change of the selected range from the P-range to the R-range.

As shown in FIG. 4, in the case that the selected range is changed from the P-range to the R-range at time t1, the target position is changed from the P-range position (motor rotation position corresponding to the P-range) to the R-range position (motor rotation position corresponding to the R-range) at the same time t1 as the change of the selected range. Further the target position is changed from the P-range position to the R-range position. Thus the switchover control (control for switching over the shift range to the R-range) for rotationally driving the motor 27 to the target position (R-range position) is started.

When the selected range is changed from the R-range to the D-range during the rotational driving of the motor 27 at time t2, the target position is changed from the R-range position to the D-range position (motor rotation position corresponding to the D-range) at the same time t2 as the change of the selected range.

When the direction of rotation of the motor 27 is the same as the direction for rotating toward the target position (D-range position) and the difference between the target position (D-range position) and the present position is larger than the threshold value, the target position is updated to the post-change target position (D-range position) and the target position is changed from the R-range position to the D-range position at time t2. Thus the control for rotationally driving the motor 27 to the target position (D-range position) is started for switching over the shift range to the D-range. Then at time t3 when the present position of the motor 27 reached the target position (D-range position), the switchover to the D-range is completed.

Figure 5:
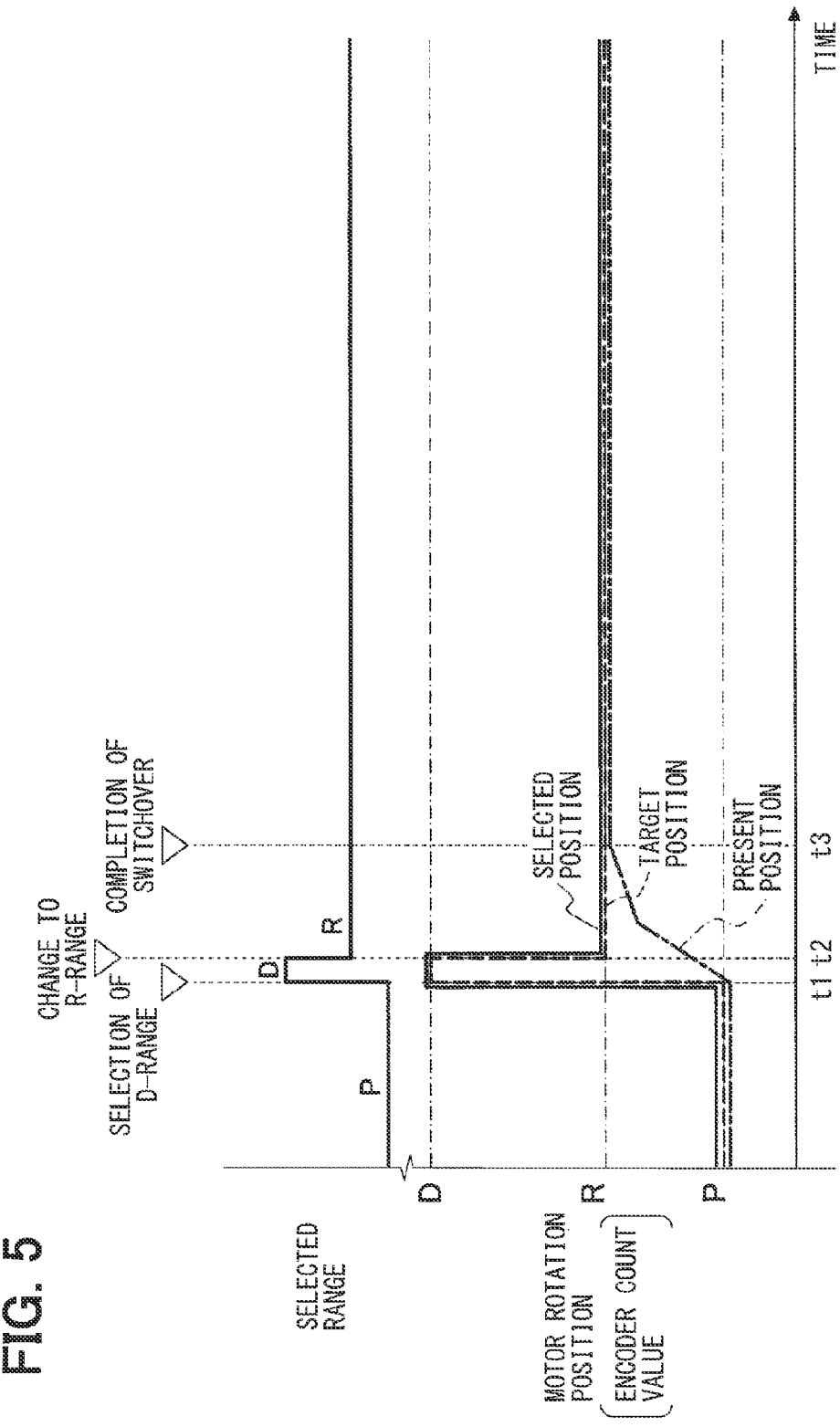
FIG. 5 is a time chart showing a first example of switchover control in a case of a change of a selected range from the P-range to the R-range through the D-range.
Figure 6:
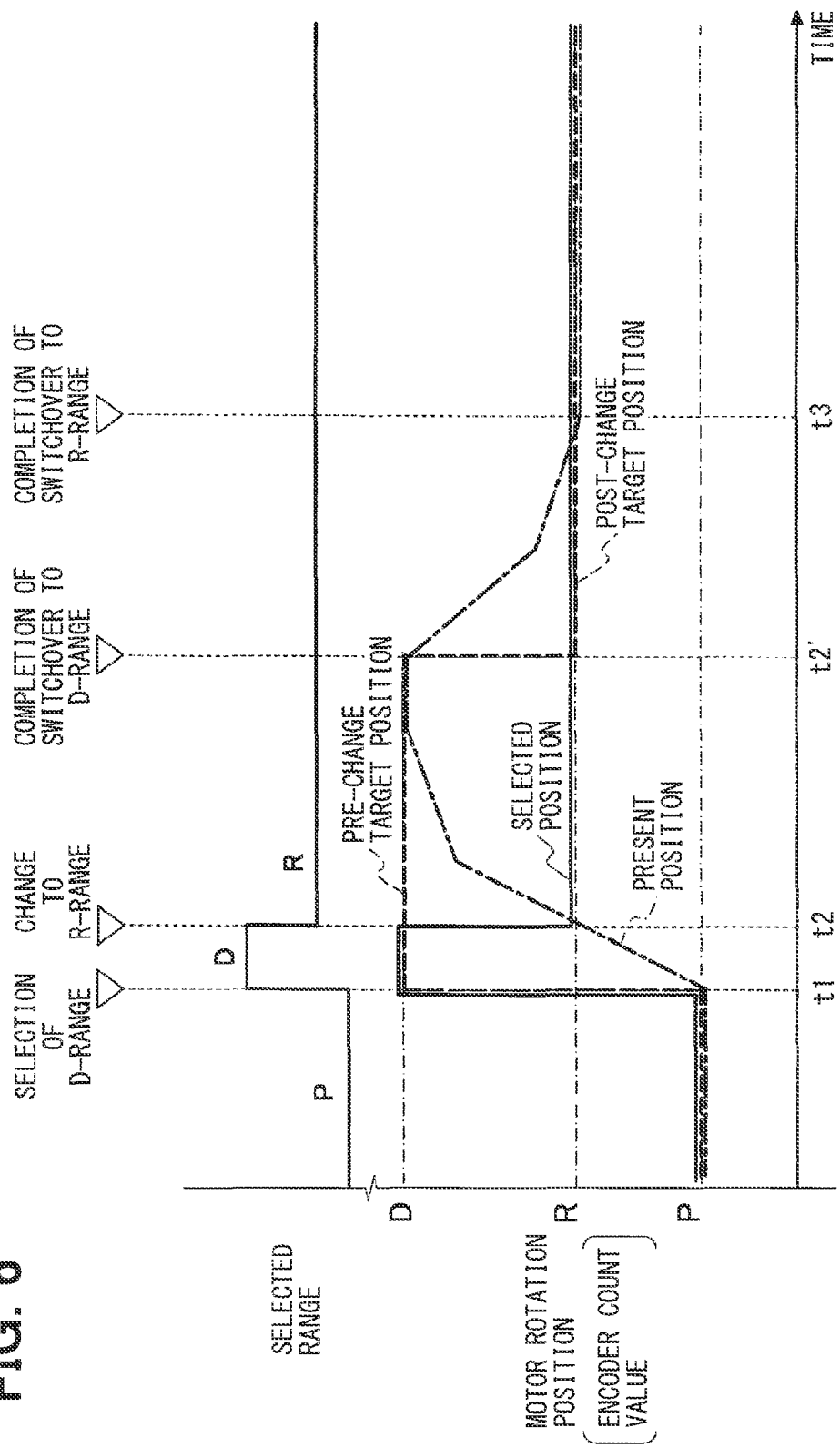
FIG. 6 is a time chart showing a second example of switchover control in a case of a change of a selected range from the P-range to the R-range through the D-range.

FIG. 5 and FIG. 6 is an example of switchover control in a case that the selected range is changed from the D-range to the R-range while the shift range is being switched over from the P-range to the D-range in correspondence to a change of the selected range from the P-range to the D-range.

As shown in FIG. 5 and FIG. 6, in the case that the selected range is changed from the P-range to the D-range at time t1, the target position is changed from the P-range position to the D-range position at time t1. Thus the switchover control (control for switching over the shift range to the D-range) for rotationally driving the motor 27 to the target position (D-range position) is started.

When the selected range is changed from the D-range to the R-range at time t2 during the rotational driving of the motor 27, that is, while the motor 27 is still being rotationally driven to complete the shifting to the D-range, the target position is changed from the D-range position to the R-range position at the same time t2 of the change of the selected range.

When the change of the selected range at time t2 is immediately after time t1 as shown in FIG. 5, the motor 27 has not been rotationally driven sufficiently. In this case, the direction of rotation of the motor 27 at time t2 is still the same as the direction for rotating toward the target position (R-range position) and the difference between the target position (R-range position) and the present position is larger than the threshold value, the target position is updated to the target position (R-range position) and the target position is changed from the R-range position to the D-range position at time t2. Thus the switchover control (control for switching over the shift range to the R-range) for rotationally driving the motor 27 to the target position (R-range position) is started.

Contrary to the case described above, when the change of the selected range at time t2 is after a certain time elapse from time t1 as shown in FIG. 6, the difference between the target position (R-range position) and the present position is equal to or smaller than the threshold value (or the direction of rotation of the motor 27 is opposite to the direction from the direction toward the target position (R-range position)), the target position is maintained at the pre-change target position (D-range position) at time t2. Thus the switchover control (control for switching over the shift range to the R-range) for rotationally driving the motor 27 to the target position (D-range position) is maintained.

Then at time t2' when the present position of the motor 27 reached the target position (D-range position) and the switchover to the D-range is completed, the target position is updated to the R-range position so that the target position is changed from the D-range position to the R-range position. Thus the switchover control (control for switching over the shift range to the R-range) for rotationally driving the motor 27 to the target position (R-range position) is started. Then at time t3 when the present position of the motor 27 reached the target position (R-range position), the switchover to the R-range is completed.

According to the present embodiment, it is determined that the motor 27 can be stopped at the target position, if the direction of rotation of the motor 27 is the same as direction for the target position and the difference between the target position and the present position is larger than the predetermined threshold value at the time of change of the selected range during the rotational driving of the motor 27. The target position is updated to the target position. Thus it is possible to speedily switch over the shift range to the post-change selected range by speedily driving the motor 27 to the post-change target position (target position) without waiting until the switchover to the pre-change selected range is completed. As a result, the response characteristic of the range switchover at the time of change of the selected range during the rotational driving of the motor 27 can be improved and the shift feeling can be improved.

Further, according to the present embodiment, it is determined that the motor 27 cannot be stopped at the target position, if the direction of rotation of the motor 27 is opposite to the direction for the target position or the difference between the target position and the present position is equal to or smaller than the predetermined threshold value at the time of change of the selected range during the rotational driving of the motor 27. The target position is updated to the target position after completion of the shift range to the pre-change selected range. Thus it is possible to switch over the shift range to the post-change selected range by surely rotating the motor 27 to the post-change target position (target position) after the completion of the switchover to the pre-change selected range. As a result, reliability of the range switchover at the time of change of the selected range during the rotational driving of the motor 27 can ensured.

In addition, according to the present embodiment, the threshold value is set in accordance with the rotation speed of the motor 27. As a result, the threshold value can be set to an appropriate value by varying it in accordance with the rotation speed of the motor 27, since the angular interval of rotation of the motor 27 required to stop the motor 27 normally varies. Although the threshold value is set in accordance with the rotation speed of the motor 27 in the above-described embodiment, the threshold value may be set in accordance with one of a temperature and a power supply voltage of the motor 27 without being limited to the rotation speed. Alternatively, the threshold value may be set in accordance with two or three of the rotation speed, the temperature and the power supply voltage of the motor 27. However, the threshold value may be set to a predetermined fixed value.

Although the present position, the pre-change target value and the post-change target position are set as encoder count values in the above-described embodiment, these positions may be set as rotation angles of the motor 27 without being limited to the encoder count values.

Although the range switchover control system is assumed to have the range switchover mechanism, which switches over the shift range among four ranges of the P-range, the R-range, the N-range and the D-range in the above-described embodiment, the range switchover control system may have a range switchover mechanism, which switches over the shift range between two ranges of a P-range and a non-P-range. Alternatively, the range switchover control system may have a range switchover mechanism, which switches over the shift range among three, five or more ranges.

Further the range switchover control system is not limited to the automatic transmission (AT, CVT, DCT or the like) but may be applied to in any other systems, for example, a range switchover control system, which switches over a shift range of a speed reduction machine of an electric vehicle.

What is claimed is:

1. A range switchover control system comprising:
a motor provided as a drive power source;
a range switchover mechanism that switches over a shift range among plural ranges by using drive power of the motor;
a range selector that selects the shift range; and
an electronic control unit programmed to switch over the shift range to a selected range by rotationally driving the motor to a target position set in accordance with the selected range,
wherein the electronic control unit is programmed to update the target position, in a case that the selected range is changed from a pre-change range of the shift range to a post-change range of the shift range during rotational driving of the motor, from a pre-change target position corresponding to the pre-change range to a post-change target position corresponding to the post-change range when a direction of rotation of the motor toward the post-change target position is same as a direction toward the pre-change target position and a difference between the post-change target position and a present position of the motor is larger than a threshold value.

2. The range switchover control system according to claim 1, wherein
the electronic control unit is programmed to update the target position, in a case that the selected range is changed from the pre-change range to the post-change range during rotational driving of the motor, from the pre-change target position to the post-change target position after completing the switchover to the pre-change range when the direction of rotation of the motor toward the post-change target position is opposite to the direction toward the pre-change target position or the difference between the post-change target position and the present position of the motor is equal to or smaller than the threshold value.

3. The range switchover control system according to claim 2, wherein the electronic control unit is programmed to set the threshold value variably in accordance with a rotation speed of the motor.

4. The range switchover control system according to claim 3, wherein
the electronic control unit is programmed to increase the threshold value in accordance with an increase in a rotation speed of the motor.

5. The range switchover control system according to claim 1, wherein
the electronic control unit is programmed to set the threshold value variably in accordance with a rotation speed of the motor.

6. The range switchover control system according to claim 5, wherein
the electronic control unit is programmed to increase the threshold value in accordance with an increase in a rotation speed of the motor.

\* \* \* \* \*